US012497630B2

(12) United States Patent
Liu et al.

(10) Patent No.: US 12,497,630 B2
(45) Date of Patent: Dec. 16, 2025

(54) USE OF SWEETPOTATO IbSAP15 GENE IN REGULATING LEAF SHAPE AND FLOWER SHAPE OF SWEETPOTATO

(71) Applicant: XUZHOU INSTITUTE OF AGRICULTURAL SCIENCES, Jiangsu (CN)

(72) Inventors: Yaju Liu, Jiangsu (CN); Hao Xie, Jiangsu (CN); Qiang Li, Jiangsu (CN); Yungang Zhang, Jiangsu (CN); Hui Yan, Jiangsu (CN); Meng Kou, Jiangsu (CN); Wei Tang, Jiangsu (CN); Xin Wang, Jiangsu (CN); Qiangqiang Yang, Jiangsu (CN); Xiaoxiao Wang, Jiangsu (CN); Ranqiu Li, Jiangsu (CN)

(73) Assignee: XUZHOU INSTITUTE OF AGRICULTURAL SCIENCES, Jiangsu (CN)

( * ) Notice: Subject to any disclaimer, the term of this patent is extended or adjusted under 35 U.S.C. 154(b) by 0 days.

(21) Appl. No.: 18/277,560

(22) PCT Filed: Nov. 17, 2022

(86) PCT No.: PCT/CN2022/132557
§ 371 (c)(1),
(2) Date: Aug. 16, 2023

(87) PCT Pub. No.: WO2023/098481
PCT Pub. Date: Jun. 8, 2023

(65) Prior Publication Data
US 2024/0132905 A1 Apr. 25, 2024
US 2024/0229061 A9 Jul. 11, 2024

(30) Foreign Application Priority Data
Dec. 3, 2021 (CN) .......................... 202111465395.9

(51) Int. Cl.
*C12N 15/82* (2006.01)

(52) U.S. Cl.
CPC .......... *C12N 15/827* (2013.01); *Y02A 40/146* (2018.01)

(58) Field of Classification Search
CPC .............. C12N 15/827; C12N 15/8261; C07K 14/415; Y02A 40/146
See application file for complete search history.

(56) References Cited

FOREIGN PATENT DOCUMENTS

| CN | 107746846 A | 3/2018 |
| CN | 112481291 A | 3/2021 |
| CN | 114134157 A | 3/2022 |

OTHER PUBLICATIONS

Agarwal et. al., Evaluating the effect of codon optimization on expression of bar gene in transgenic tobacco plants, Journal of Plant Biochemistry and Biotechnology, 28(2), pp. 189-202. 2019 (Year: 2019).*
Tanaka et. al., Altered carbohydrate metabolism in the storage roots of sweetpotato plants overexpressing the SRF1 gene, which encodes a Dof zinc finger transcription factor, Planta (2009) 230, pp. 737-746 (Year: 2009).*
Sreedharan et. al., MusaSAP1, a A20/AN1 zinc finger gene from banana functions as a positive regulator in different stress responses, Plant Mol Biol (2012) 80:503-517 (Year: 2012).*
Sequence homology_Seq ID1_protein_Vs_Uniprot_AC_A0A8B0SXV5 (Year: 2021).*
Nakagawa et al., "Development of Series of Gateway Binary Vectors, pGWBs, for Realizing Efficient Construction of Fusion Genes for Plant Transformation", 2007, J. of BioSc. and BioEng., 104:34-41 (Year: 2007).*
International Search Report, International Application No. PCT/CN2022/132557, dated Feb. 6, 2023.
Qiangqiang Yang et al. "Sweetpotato IbSAP15 gene confers salinity stress tolerance in *Arabidopsis*"—English transaltion.
Expression Pattern Analysis of Stress Associated Protein (SAP) Genesand Function Analysis of IbSAP15 and IbSAP16in Sweetpotato, *Ipomoea batatas* (L.) Lam, May 2017, (c) 1994-2022 China Academic Journal Publishing House.—abstract translation.
Hao Xie, et al. "Genome-Wide Identification of the A20/AN1 Zinc Finger Protein Family Genes in Ipomoea batatas and Its Two Relatives and Function Analysis of IbSAP16 in Salinity Tolerance" International Journal of Molecular Sciences 2022, 23, 11551.
Chinese Office Action dated Oct. 10, 2022, China Application No. 202111465395.9.

* cited by examiner

*Primary Examiner* — Bratislav Stankovic
*Assistant Examiner* — Jay Chatterjee
(74) *Attorney, Agent, or Firm* — Patterson + Sheridan, LLP

(57) ABSTRACT

Provided is the use of sweetpotato IbSAP15 gene in regulating leaf shape and flower shape of sweetpotato. Compared with the control, *Ipomoea batatas* cv. Xuzishu 8, IbSAP15-overexpressing lines have deeper sinuses, dehiscent corollas, and higher ornamental value. In the present disclosure, overexpression of the sweetpotato IbSAP15 gene in sweetpotato can increase a sinus depth of a sweetpotato leaf, make trumpet-shaped corollas dehiscent, and change leaf shape and flower shape of sweetpotato. The present disclosure is suitable for developing sweetpotato germplasms with different leaf shape and flower shape and promotes ornamental flowering/foliage sweetpotato breeding.

2 Claims, 6 Drawing Sheets

Specification includes a Sequence Listing.

SEQUENCE LISTING

```
Sequence total quantity: 10
SEQ ID NO: 1            moltype = DNA  length = 579
FEATURE                 Location/Qualifiers
source                  1..579
                        mol_type = other DNA
                        organism = synthetic construct
SEQUENCE: 1
atgggaggag gaacagaagc tttcccagat ttaggacgcc attgcgaatt ctccgattgc    60
cgccaactcg attttctccc cttccaatgc gacgcttgcc gtcacgtttt ctgtgtagac   120
caccgatcat ataaatccca cgcctgccca aaatccgacc gccatagccg caaggttgtg   180
gtgtgcgacg cctgttccac gtcgatcgag accaccggct gcggcggcga agacgaggag   240
aaggccatat tgcagaggca ccagaaatta gggcactgtg atcccgcgaa gaagaagaaa   300
cctacgtgcc ccgtgaggcg gtgcaaggaa cctttaacct tctcaaatac tagcgtctgt   360
aagggctgcc agattccggt gtgcttaaaa caccgttttc cggcggatca cgcttgcaaa   420
ggcagagcca cttcttctcc ggcgccgccg gcgctcaggg gcggcgtcaa taacaagttt   480
ctggttgcgt ttgctgcaag gaacccgaaa gattgtggaa acaagagccg ggattctacg   540
tcttctccaa ctaccatacc ttctgttaaa gctttttga                          579

SEQ ID NO: 2            moltype = AA  length = 192
FEATURE                 Location/Qualifiers
source                  1..192
                        mol_type = protein
                        organism = synthetic construct
SEQUENCE: 2
MGGGTGAPPA LGAHCGPSAC AGLAPLPPGC AACAHVPCVA HASTLSHACP LSAAHSALVV    60
VCAACSTSIG TTGCGGGAGG LAILGAHGLL GHCAPALLLL PTCPVAACLG PLTPSATSVC   120
LGCGIPVCLL HAPPAAHACL GAATSSPAPP ALAGGVAALP LVAPAAAAPL ACGALSAAST   180
SSPTTIPSVL AP                                                      192

SEQ ID NO: 3            moltype = DNA  length = 21
FEATURE                 Location/Qualifiers
source                  1..21
                        mol_type = other DNA
                        organism = synthetic construct
SEQUENCE: 3
atgggaggag gaacagaagc t                                             21

SEQ ID NO: 4            moltype = DNA  length = 33
FEATURE                 Location/Qualifiers
source                  1..33
                        mol_type = other DNA
                        organism = synthetic construct
SEQUENCE: 4
tcaaaaagct taacagaag gtatggtagt tgg                                 33

SEQ ID NO: 5            moltype = DNA  length = 24
FEATURE                 Location/Qualifiers
source                  1..24
                        mol_type = other DNA
                        organism = synthetic construct
SEQUENCE: 5
atgagcgact acaaggatga cgat                                          24

SEQ ID NO: 6            moltype = DNA  length = 24
FEATURE                 Location/Qualifiers
source                  1..24
                        mol_type = other DNA
                        organism = synthetic construct
SEQUENCE: 6
accactttgt acaagaaagc tggg                                          24

SEQ ID NO: 7            moltype = DNA  length = 20
FEATURE                 Location/Qualifiers
source                  1..20
                        mol_type = other DNA
                        organism = synthetic construct
SEQUENCE: 7
```

-continued

```
gatcacgctt gcaaaggcag                                                 20

SEQ ID NO: 8           moltype = DNA  length = 24
FEATURE                Location/Qualifiers
source                 1..24
                       mol_type = other DNA
                       organism = synthetic construct
SEQUENCE: 8
cgtagaatcc ctgctcttgt ttcc                                            24

SEQ ID NO: 9           moltype = DNA  length = 20
FEATURE                Location/Qualifiers
source                 1..20
                       mol_type = other DNA
                       organism = synthetic construct
SEQUENCE: 9
ctttgccaag aaggagatgc                                                 20

SEQ ID NO: 10          moltype = DNA  length = 20
FEATURE                Location/Qualifiers
source                 1..20
                       mol_type = other DNA
                       organism = synthetic construct
SEQUENCE: 10
tcttgtcctg accaccaaca                                                 20
```

USE OF SWEETPOTATO *IbSAP15* GENE IN REGULATING LEAF SHAPE AND FLOWER SHAPE OF SWEETPOTATO

CROSS REFERENCE TO RELATED APPLICATION

This application is a national phase entry under 35 USC 371 of International Patent Application No. PCT/CN2022/132557, filed on Nov. 17, 2022, which claims priority of Chinese Patent Application No. CN202111465395.9, filed with the China National Intellectual Property Administration on Dec. 3, 2021, entitled "USE OF SWEETPOTATO IbSAP15 GENE IN REGULATING LEAF SHAPE AND FLOWER SHAPE OF SWEETPOTATO", which is incorporated herein by reference in its entirety.

REFERENCE TO SEQUENCE LISTING

A computer readable XML file entitled "GWPCTP20230503759", which was created on Jul. 31, 2023, with a file size of about 12,687 bytes, contains the sequence listing for this application, has been filed with this application, and is hereby incorporated by reference in its entirety.

TECHNICAL FIELD

The present disclosure belongs to the technical field of plant genetic engineering, and relates to use of sweetpotato IbSAP15 gene in regulating leaf shape and flower shape of sweetpotato.

BACKGROUND

The zinc-finger domains contain a plurality of cysteine and histidine residues, which can bind to zinc ions and fold themselves into a "finger" shape, so they are called zinc fingers. Proteins containing zinc-finger domains are referred to as zinc-finger proteins (Klug et al., 1987). Zinc-finger proteins can interact with DNA, RNA or other proteins to regulate gene transcription, translation and other processes. Plant stress-associated protein (SAP) family members contain A20/AN1 zinc-finger domains and regulate plant responses to biotic and abiotic stresses as well as growth and development. SAPs function as ubiquitin ligase or transcription factor, or by sensing changes in intracellular redox states through conformational alteration, to regulate plant responses to biotic and abiotic stresses and growth and development.

Sweetpotato is an important food crop, as well as an important vegetable, forage and industrial crop. Since the $21^{st}$ century, sweetpotato has gradually been used as an ornamental plant. According to the different ornamental parts, ornamental sweetpotato can be divided into four types: foliage type, ornamental vine type, flowering type, and ornamental tuber type (Ren et al., 2005). Sweetpotato has diverse leaf shapes, such as cordate, palmate, hastate, and the like. The leaf shape of ornamental foliage sweetpotato is dominated by compound incised and chicken-foot shapes. The leaf color is purple, pale green, or mixed colors. The corolla of sweetpotato is trumpet-shaped and consists of 5 petals fused together, which resemble the flower of morning glory, and the flower colors mainly include white, lavender, light pink, and etc.

Ornamental flowering sweetpotato cultivars are required to be easy flowering with large flowering amount and long florescence. Their blooming can be induced by short-day condition (Meng et al., 2019), and the flower amount may increase by proper fertilization (Qiu et al., 2010). Ornamental sweetpotato can be grown indoors through hydroponics or substrates to decorate indoor environments. Hydroponics is simple and low-cost, and can form a vibrant ecosystem with aquatic organisms such as ornamental fish, turtles or other aquatic plants. Potted sweetpotato can be used for the decoration of living rooms, balconies, offices, conference halls, and so on. Outdoor planting of ornamental sweetpotato can be used for three-dimensional decoration, slope greening, sidewalk greening, and rock greening. Different from indoor planting, the area of outdoor planting of ornamental sweetpotato is much larger, which can form a more aesthetic landscape by planting ornamental sweetpotato of different leaf colors and plant shapes, or by matching ornamental sweetpotato with other ornamental plants (Meng et al., 2019). At present, there are few studies on the flower type of sweetpotato, and there are only a few ornamental flowering sweetpotato cultivars in the market.

SUMMARY

The present disclosure provides use of sweetpotato IbSAP15 gene in regulating leaf shape and flower shape of sweetpotato.

The IbSAP15 gene provided by the present disclosure is an AN1 zinc-finger protein encoding gene cloned from sweetpotato, a protein encoded thereby includes two conserved AN1 zinc-finger domains that have specific sequences, and CDS thereof is 579 bp, having a nucleotide sequence shown in SEQ ID NO: 1.

The present disclosure further provides protein IbSAP15 encoded by the foregoing IbSAP15 gene, including 192 amino-acid residues, and having an amino-acid sequence shown in SEQ ID NO: 2.

The present disclosure further provides a method for regulating leaf shape and flower shape of sweetpotato, including overexpressing the IbSAP15 gene in the sweetpotato.

The present disclosure discovers for the first time that overexpression of IbSAP15 gene in sweetpotato can increase a sinus depth of a sweetpotato leaf, make trumpet-shaped corollas dehiscent, and thus change leaf shape and flower shape of the sweetpotato. The present disclosure is suitable for breeding sweetpotato germplasms with different leaf shapes and flower shapes and increases ornamental flowering/foliage sweetpotato cultivars.

The present disclosure further provides a recombinant plant expression vector, including a starting vector and the IbSAP15 gene.

Preferably, the starting vector is a plant expression vector pGWB12.

BRIEF DESCRIPTION OF THE DRAWINGS

FIG. 8 is a front view of flowers of the IbSAP15-OE lines and the control; FIG. 9 is a top view of flowers of the IbSAP15-OE lines and the control; the scale bar is 2 cm.

DETAILED DESCRIPTION OF THE EMBODIMENTS

Figure 1:
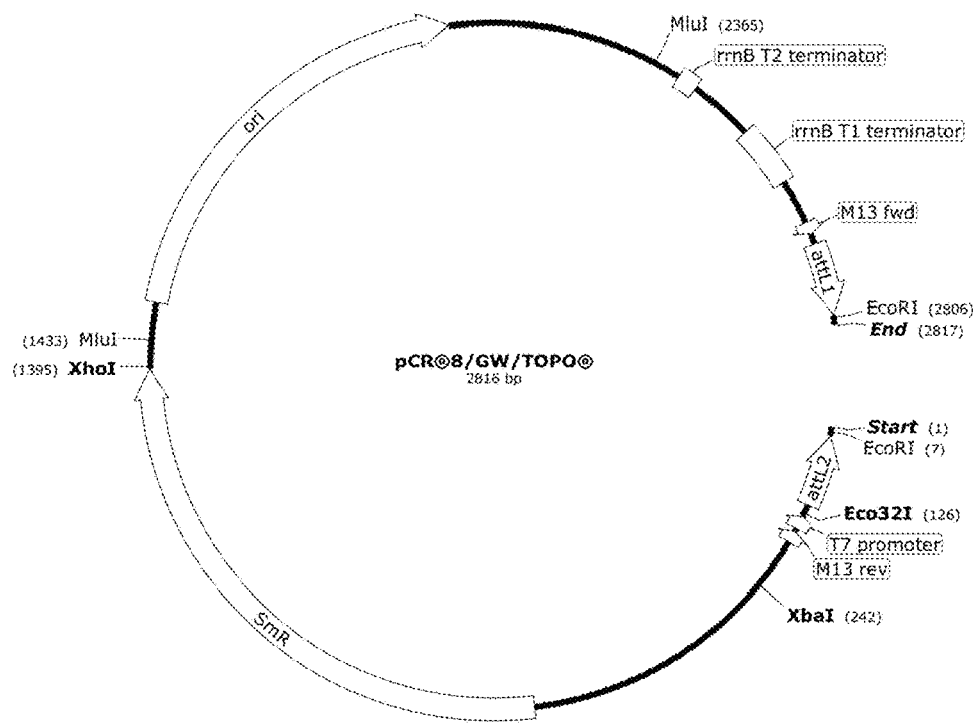
FIG. 1 shows a schematic diagram of the structure of a linearized entry vector pCR®8/GW/TOPO®.
Figure 2:
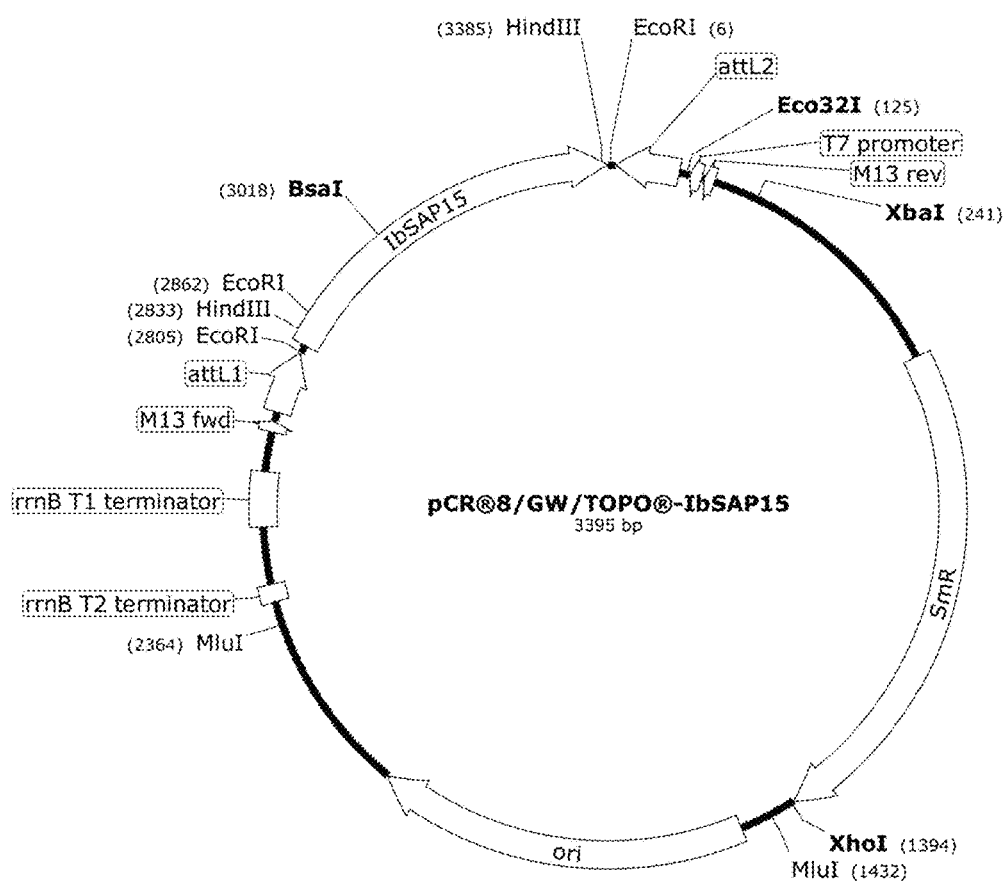
FIG. 2 shows a schematic diagram of the structure of a recombinant entry vector pCR®8/GW/TOPO®-IbSAP15.
Figure 3:
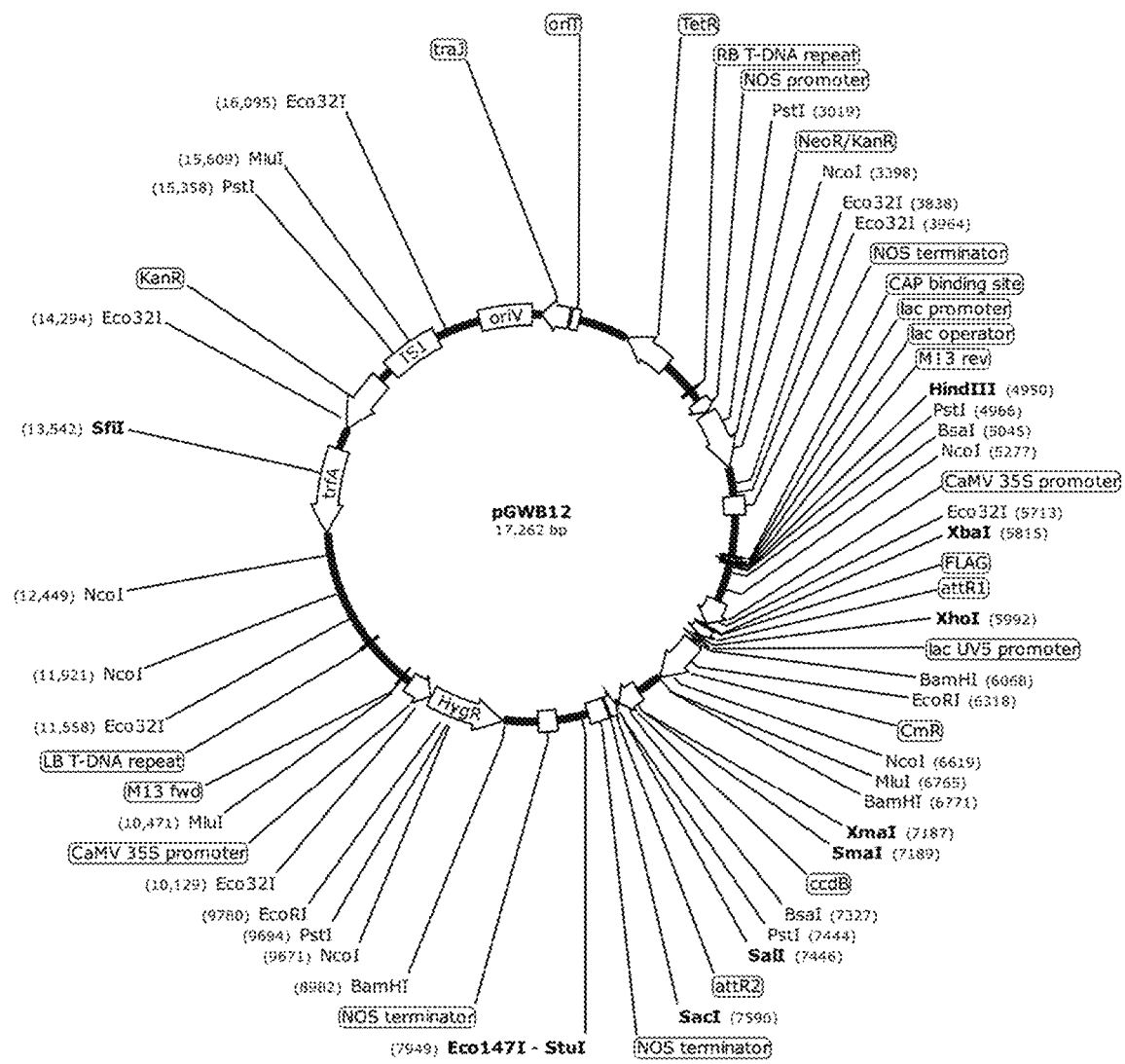
FIG. 3 shows a schematic diagram of the structure of a plant overexpression vector pGWB12.
Figure 4:
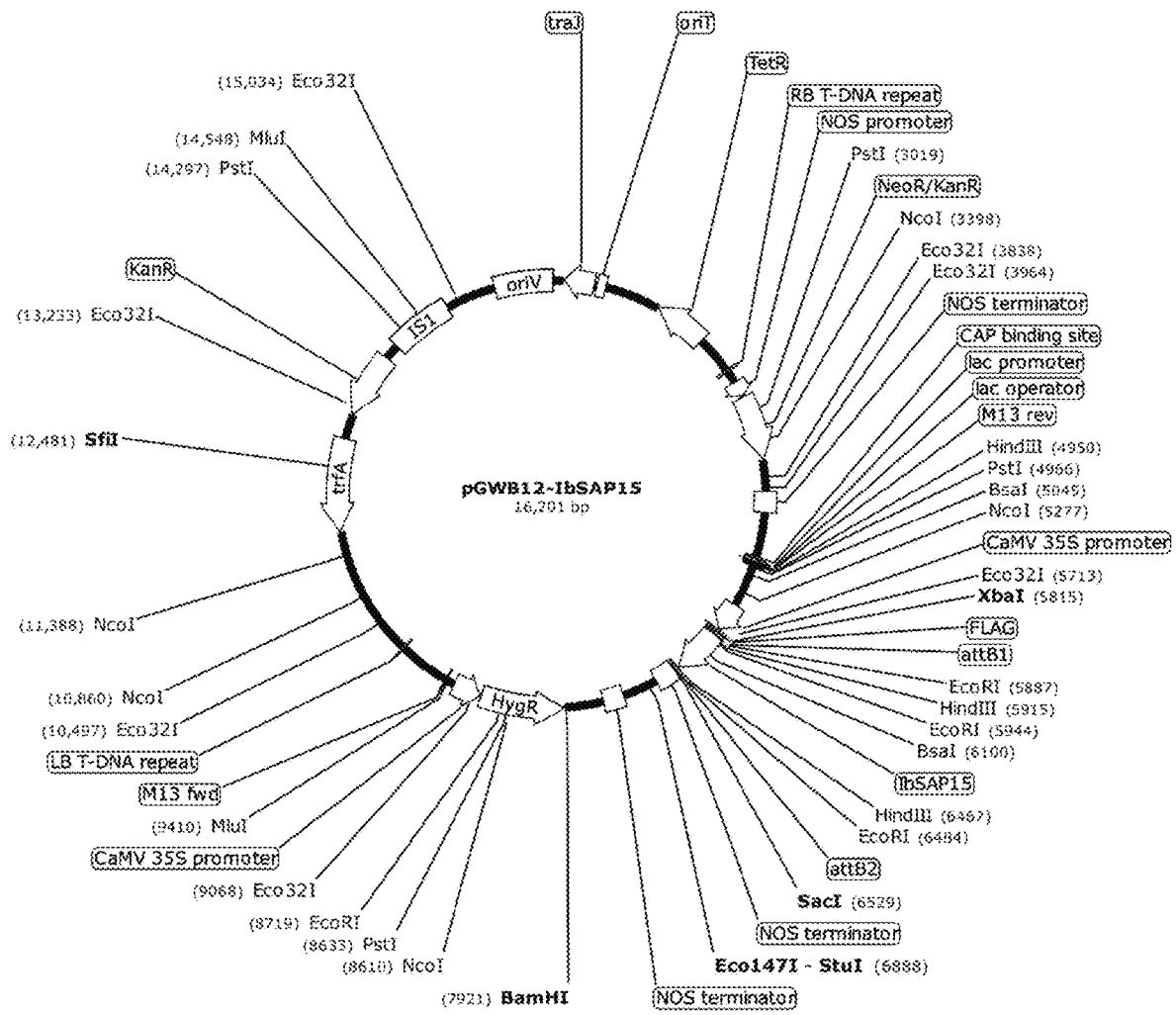
FIG. 4 shows a schematic diagram of the structure of a recombinant plant expression vector pGWB12-IbSAP15.

To make the objectives, technical solutions, and advantages of the present disclosure clearer, the present disclosure is further described in detail below with reference to the accompanying drawings and examples. It should be understood that the specific examples described herein are merely intended to explain the present disclosure, but not to limit the present disclosure.

All experimental methods used in the following examples are conventional methods, unless otherwise specified.

All materials and reagents used in the following examples are commercially available, unless otherwise specified.

Example 1: Cloning of IbSAP15 Gene and Construction of Overexpression Vector The sweetpotato cultivar used in the example was *Ipomoea batatas* cv. Xuzishu 8 (Zi8), which was bred by crossbreeding of parents *I. batatas* cv. Xuzishu 3 and *I. batatas* cv. Wanzi 56, being a fresh food cultivar with high yield, high drying rate, and high anthocyanin content. Zi8 has a lobed leaf shape and is easy to bloom. It is also a high-quality ornamental sweetpotato.

The CDS sequence of IbSAP15 was obtained from the transcriptome sequencing data of sweetpotato (see GenBank accession number MW661075, ncbi.nlm.nih.gov/nuccore/2026807425). The full-length CDS of IbSAP15 was amplified by PCR from the cDNA of mixed sweetpotato tissue samples with the specific primers tIbSAP15-F (SEQ ID No: 3) and tIbSAP15-R (SEQ ID No: 4), and then ligated to the entry vector pCR®8/GW/TOPOR to construct the recombinant entry vector pCR@8/GW/TOPOR-IbSAP15. Through the LR reaction, the IbSAP15 fragment with correct nucleotide acid sequences on the pCR@8/GW/TOPOR-IbSAP15 was displaced into the plant expression vector pGWB12 to obtain the recombinant plant expression vector pGWB12-IbSAP15. Specific steps are as follows:

1. RNA extraction and integrity detection of mixed sweetpotato samples: Leaves, adventitious roots, and flowers of hydroponic sweetpotato were sampled, ground into powders in liquid nitrogen, and mixed in equal proportions. About 100 mg of sample powder was taken, and total RNA was extracted from the mixed sample by using Quick RNA Isolation Kit (Huayueyang Biotechnology) according to the instructions. The RNA concentration was detected using a NanoDrop 1000 UV Spectrophotometer, and 1 μg of total RNA was taken to check the integrity by 1% agarose gel electrophoresis.

2. First-strand cDNA synthesis: First-strand cDNA was synthesized using the ReverTra qPCR RT Master Mix with gDNARemover (Toyobo) cDNA Synthesis Kit. 500 ng of RNA was used as a template, and the total system was 10 μL. The specific synthesis steps were referred to the kit instructions.

3. Amplification of IbSAP15 and construction of entry vector: Primer pairs tIbSAP15-F (SEQ ID NO: 3) and tIbSAP15-R (SEQ ID NO: 4) were used to conduct PCR amplification with mixed sweetpotato sample cDNA as a template. The DNA polymerase used was Taq™ Version 2.0 plus dye (TaKaRa). The total reaction system was 50 μL in volume, including 25 μL of Taq Version 2.0 plus dye (2×), 1 μL of cDNA template, 2 μL each of 10 mmol·L$^{-1}$ forward and reverse primers, and 20 μL of ddH$_2$O. The PCR amplification program included: initial denaturation at 98° C. for 30 s; 35 cycles of denaturation at 98° C. for 10 s, annealing at 60° C. for 15 s, and extension at 72° C. for 15 s; full extension at 72° C. for 2 min, and storage at 4° C. The PCR product was subjected to electrophoresis and gel extraction, and the gel extraction product was ligated to linearized pCR®8/GW/TOPO® (Invitrogen) by TA cloning to construct an entry vector pCR®8/GW/TOPO®-IbSAP15, which was transformed into *E. coli* DH5α. The positive clones were picked and sent to Sangon Biotech (Shanghai) Co., Ltd. for sequencing, and monoclones with correct sequence and orientation were selected to purify pCR®8/GW/TOPO®-IbSAP15 plasmids for subsequent experiments.

```
tIbSAP15-F (SEQ ID NO: 3):
5'-ATGGGAGGAGGAACAGAAGCT-3',
and

5'-tIbSAP15-R
(SEQ ID NO: 4):
TCAAAAAGCTTTAACAGAAGGTATGGTAGTTGG-3'.
```

4. Construction of IbSAP15 expression vector: 100 ng of pCR®8/GW/TOPO®-IbSAP15 and 100 ng of pGWB12 plasmids were mixed well with 2 μL of Gateway LR Clonase II Enzyme Mix (Invitrogen), and ddH$_2$O was replenished to 10 μL, followed by incubation at 25° C. for 1 h. 1 μL of proteinase K was added, and the reaction was terminated at 37° C. for 10 min. 1 μL of the reaction buffer was transformed into *E. coli* DH5α, positive clones were picked to extract plasmids, and the plant expression vector pGWB12-IbSAP15 was obtained.

Example 2: Overexpression of the IbSAP15 Gene in Sweetpotato

To study the function of the IbSAP15 gene, the IbSAP15 gene was overexpressed in sweetpotato, and the function of IbSAP15 gene was analyzed by comparing the phenotypes of the overexpressing lines and the control plants. *Agrobacterium*-mediated sweetpotato genetic transformation methods included infection, co-culture, screening and identification, seedling induction. Subsequently, propagation was conducted through tissue culture, rapid propagation, and cuttage after transplanting. Antibiotics and hormones used included 2,4-dichlorophenoxyacetic acid (2,4-D), abscisic acid (ABA), kanamycin (Kan), hygromycin B (Hyg), rifampin (Rif), and cefotaxime sodium (Cef). The culture media used included: YEB (1 g·L$^{-1}$ yeast extract, 5 g·L$^{-1}$ beef extract, 5 g·L$^{-1}$ sucrose, 5 g·L$^{-1}$ peptone, and 0.5 g·L$^{-1}$ MgSO$_4$·7H$_2$O), MS (purchased from Beijing Coolaber Technology Co., Ltd.), and MSD (MS+2 mg·mL$^{-1}$ 2,4-D). Other reagents included: acetosyringone (AS). The method specifically includes the following steps.

1. Agrobacterium-Mediated Sweetpotato Genetic Transformation:

The plant expression vector pGWB12-IbSAP15 was transformed into the competent *Agrobacterium* strain GV3101 by liquid nitrogen freeze-thaw method, and positive clones were picked, inoculated into 1 mL of YEB broth supplemented with 50 mg·L$^{-1}$ Kan and 20 mg·mL$^{-1}$ Rif, and cultured at 28° C. overnight. 500 μL of bacterial suspension cultured overnight was pipetted, transferred to a new 50 mL YEB broth supplemented with 50 mg·L$^{-1}$ Kan and 20 mg·mL$^{-1}$ Rif, and cultured to $OD_{600}$=0.6 or so. Cells were collected by centrifugation at 4,000 rpm for 5 min and resuspended in MSD broth, the $OD_{600}$ was adjusted to 0.1-0.2, and AS was added to a final concentration of 30 mg·L$^{-1}$. The sweetpotato calli were crushed into particles of 1-2 mm, washed thrice with MSD, placed in 10 mL of resuspended *Agrobacterium* suspension, cultured at 40 rpm and 25° C. for 30 min in the dark, and sonicated for 15 s. The calli were taken out, placed on MSD+30 mg·L$^{-1}$ AS media with filter paper, and co-cultured in the dark. After 3 days, the calli were washed with MSD until the supernatant was clear, transferred to MSD+300 mg·L$^{-1}$ Cef broth, shaken slowly at room temperature for 1 h in the dark, and then inoculated on MSD+200 mg L$^{-1}$ Cef solid media to co-culture for two weeks.

2. Screening, Induction and Transplanting of Resistant Calli

The calli co-cultured for two weeks were transferred to MSD+10 mg L$^{-1}$ Hyg+200 mg·L$^{-1}$ Cef solid media. After two weeks, the calli in good condition were picked and subcultured on new media for another two weeks. The calli were transferred to MS+10 mg·L$^{-1}$ Hyg+200 mg·L$^{-1}$ Cef+1 mg·L$^{-1}$ ABA solid media to induce somatic embryos and subcultured every 2 weeks. After bud formation, somatic embryos were transferred to MS+10 mg·L$^{-1}$ Hyg+200 mg·L$^{-1}$ Cef solid media to form plantlets. The plantlets grown to no less than 6 cm were cut into sections and transferred onto MS agar for propagation. After the tissue cultured plantlets were propagated to a large amount, some well-grown ones were selected for transplanting. The media on the tissue cultured plantlets were cleaned with water; the plantlets were transplanted into nutrient soil, moisturized with plastic wrap, and placed in a 28° C. culture room for light culture. After one day, the plastic wrap was removed and the plantlets were cultured normally.

Example 3: Identification of IbSAP15-OE Lines and Detection of Expression Levels of IbSAP15

1. Identification of IbSAP15-OE Transgenic Lines

Figure 5:
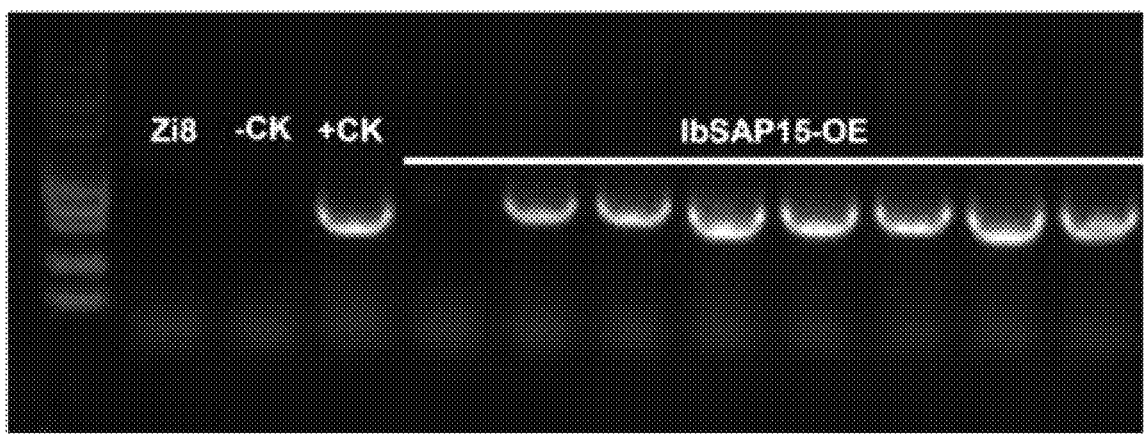
FIG. 5 illustrates the detection results of IbSAP15-OE lines, where Zi8, −CK, and +CK are the detection results of a cultivar, a negative control, and a positive control, respectively, and IbSAP15-OE is the detection results of different IbSAP15-OE lines.

The genomic DNA was extracted from the positive lines and the control plants by the modified cetyltrimethylammonium bromide (CTAB) method, and IbSAP15-OE detection primers FLAG-F (pGWB12) (SEQ ID NO: 5) and ATTB2-R (SEQ ID NO: 6) were used for PCR amplification; pGWB12-IbSAP15 plasmid was used as a positive control, genomic DNA of cultivar Zi8 as a negative control, and ddH$_2$O as a blank control. The DNA polymerase used was 2×PCR Master Mix (CWBIO). The total reaction system was 20 μL in volume, including 10 μL of 2×PCR Master Mix, 1 μL of template, 0.5 μL each of 10 mmol L$^{-1}$ forward and reverse primers, and 8 μL of ddH$_2$O. The PCR amplification program included: initial denaturation at 94° C. for 2 min; 35 cycles of denaturation at 94° C. for 30 s, annealing at 60° C. for 30 s, and extension at 72° C. for 30 s; full extension at 72° C. for 2 min, and storage at 4° C. After the reaction, agarose gel electrophoresis was used for analysis. The cultivar (Zi8) and the negative control (−CK) showed no amplified band, the positive control (+CK) showed an amplified band with a size of 950 bp; bands consistent with that of the positive control were amplified in 7 of 8 quasi-transgenic lines, and these seven lines were identified as IbSAP15-OE transgenic lines (FIG. 5).

```
FLAG-F (pGWB12)
(SEQ ID NO: 5):
5'-ATGAGCGACTACAAGGATGACGAT-3';

ATTB2-R
(SEQ ID NO: 6):
5'-ACCACTTTGTACAAGAAAGCTGGG-3'.
```

Figure 6:
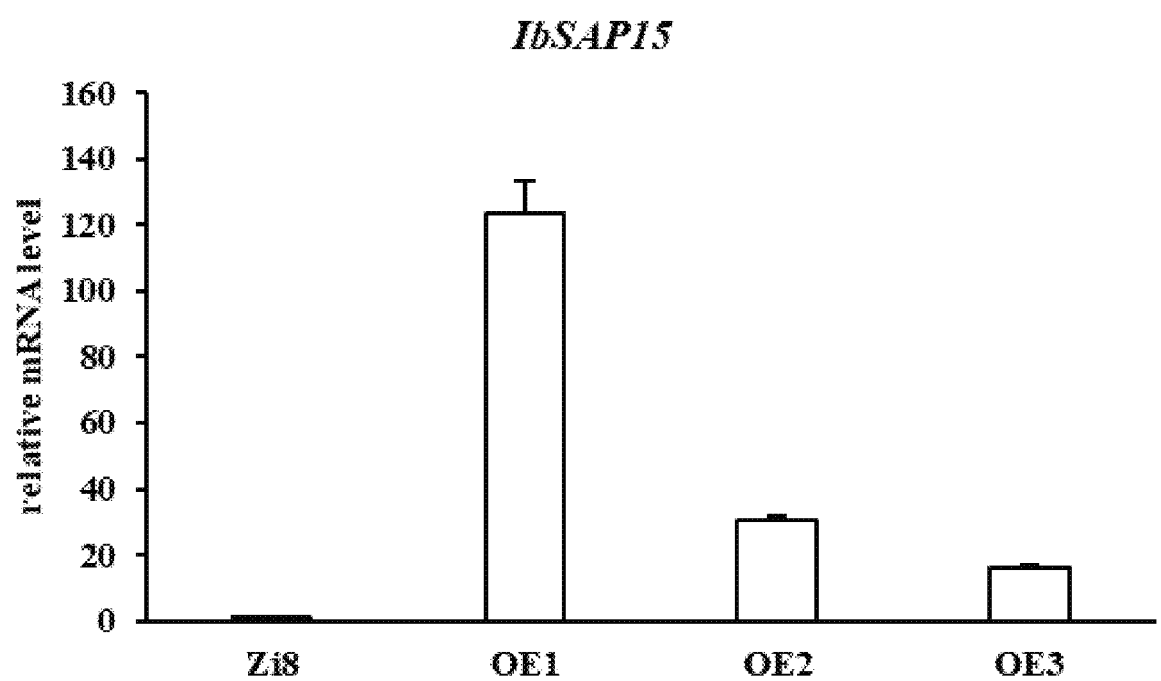
FIG. 6 illustrates the result of relative expression levels of IbSAP15 in IbSAP15-OE lines and the control.

2. Detection of Expression Levels of IbSAP15 in IbSAP15-OE Transgenic Lines Referring to Example 1, RNA was extracted from the leaves of the IbSAP15-OE transgenic lines and reverse transcribed into cDNA. The expression level of IbSAP15 was detected by RT-qPCR. SYBR Green Realtime PCR Master Mix (Toyobo) was used for RT-qPCR assay. The reaction system was 10 μL, including 50 μL of 2×SYBR Green Realtime PCR Master Mix (Toyobo), 2 μL of 20-fold diluted cDNA template, 0.5 μL each of 10 mmol L$^{-1}$ forward and reverse primers qIbSAP15-F (SEQ ID NO: 7) and qIbSAP15-R (SEQ ID NO: 8), and 2 μL of ddH$_2$O. The RT-qPCR program used was as follows: stage 1: initial denaturation at 95° C. for 10 min; stage 2: 40 cycles of denaturation at 95° C. for 15 s, annealing at 60° C. for 15 s, and extension at 72° C. for 20 s; stage 3: detection of a dissolution curve at 65-95° C. *I. batatas* ADP-ribosylation factor (IbARF) gene (Park et al., 2012) was used as the internal reference, and the primer sequences were qIbARF-F (SEQ ID NO: 9) and qIbARF-R (SEQ ID NO: 10). The relative expression level of IbSAP15 in each line in comparison with that in Zi8 was calculated by the $2^{-\Delta\Delta Ct}$ method. Herein, the expression levels of three IbSAP15-OE lines are shown in FIG. 6, which are 123.56, 30.78, and 16.16 times that of the cultivar Zi8, and these lines are named OE1, OE2 and OE3, respectively.

```
qIbSAP15-F
(SEQ ID NO: 7):
5'-GATCACGCTTGCAAAGGCAG-3', qIbSAP15-R
(SEQ ID NO: 8):
5'-CGTAGAATCCCTGCTCTTGTTTCC-3', qIbARF-F
(SEQ ID NO: 9):
5'-CTTTGCCAAGAAGGAGATGC-3',
and qIbARF-R
(SEQ ID NO: 10):
5'-TCTTGTCCTGACCACCAACA-3'.
```

Example 4: Comparison of Leaf Shape and Flower Shape Between IbSAP15-OE Lines and Zi8

Figure 7:
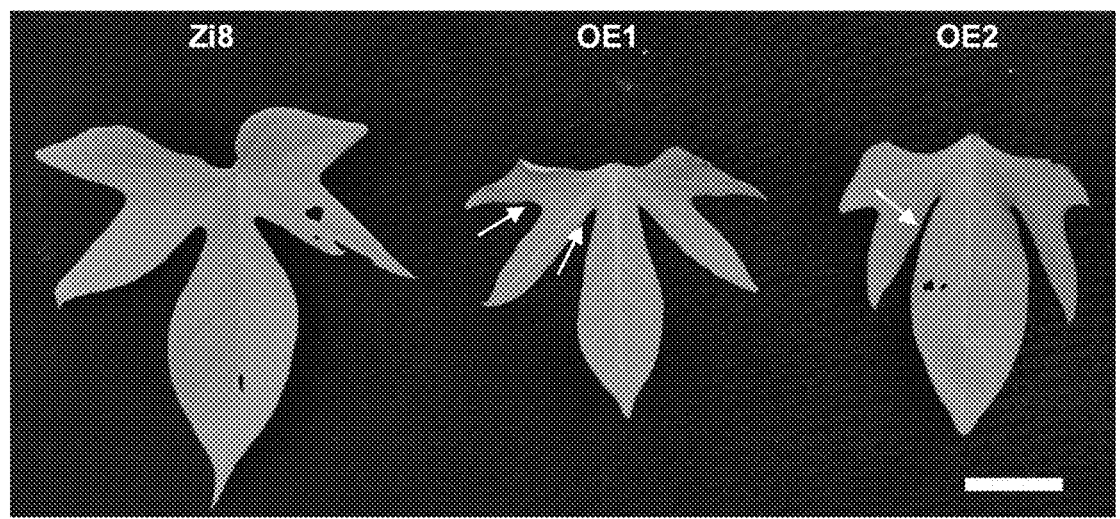
FIG. 7 illustrates a comparison of leaf shape of IbSAP15-OE lines and the control, where the arrows indicate parts where sinuses become deeper, and the scale bar is 2 cm.

Compared with the leaves of Zi8, the leaf shape of the overexpressed lines changed. The leaves of OE1 and OE2 lines were smaller than those of Zi8, and their sinuses became deeper. Especially in the OE1 line, the leaves approximated chicken feet and had more ornamental value (FIG. 7).

Figure 8:
FIG. 8 and FIG. 9 illustrate a comparison of flower shape of IbSAP15-OE lines and the control.
Figure 9:

The IbSAP15-OE lines and the cultivar Zi8 were planted in flowerpots and cultivated in normal sunshine, and their flower shapes were compared after flowering. During this period, flowering could be accelerated under short-day photoperiods, namely, 8 h light/16 h dark cultivation. The corolla of the cultivar was trumpet-shaped, and five petals of each corolla fused together. The corollas of the IbSAP15-OE lines showed different degrees of dehiscence. The floral tube of the OE1 line was completely dehiscent, and that of the OE2 line was partially dehiscent, which was extremely rare in sweetpotato and its relatives, and had extremely high ornamental value (FIG. 8 and FIG. 9).

Although the above example has described the present disclosure in detail, it is only a part of, not all of, the examples of the present disclosure. Other examples may also be obtained by persons based on the example without creative efforts, and all of these examples shall fall within the protection scope of the present disclosure.

What is claimed is:

1. A method for producing flowers with dehiscent corolla in sweetpotato, comprising inserting a sweetpotato gene into plant expression vector pGWB12 and then introducing the plant expression vector into the sweetpotato such that the sweetpotato gene is overexpressed in the sweetpotato;
   wherein the sweetpotato gene is a IbSAP15 gene having the nucleotide sequence set forth in SEQ ID NO: 1, and
   wherein an expression level of IbSAP15-overexpressed sweetpotato plants is 30.78 to 123.56 times that of cultivar Zi8.

2. The method according to claim 1, wherein a protein encoded by the IbSAP15 gene has the amino acid sequence set forth in SEQ ID NO: 2.

* * * * *